United States Patent Office 3,453,504
Patented July 1, 1969

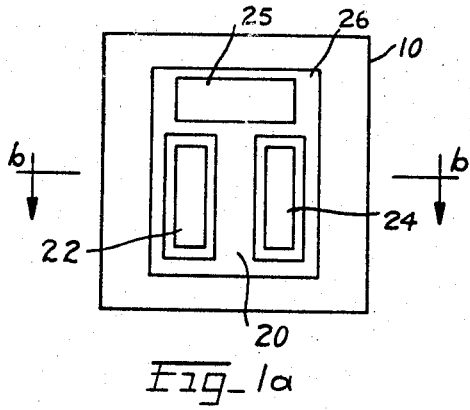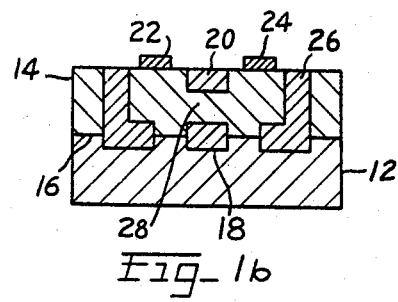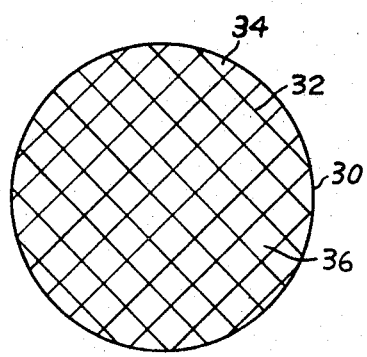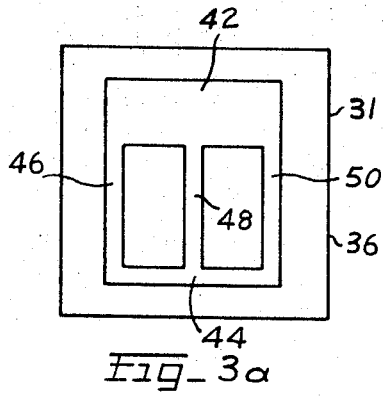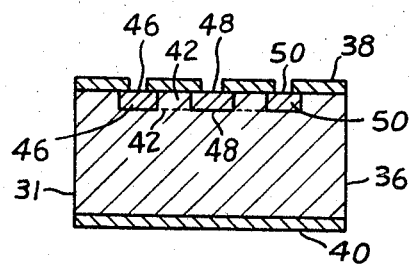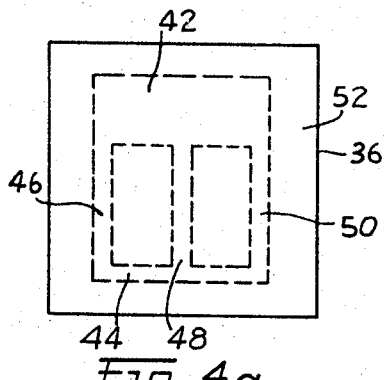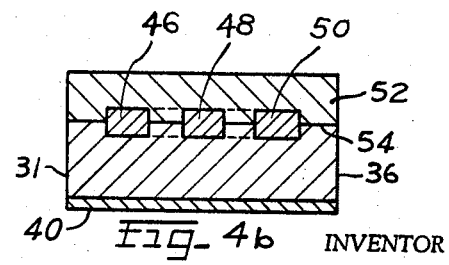
INVENTOR
JAMES B. COMPTON
FREDERICK L. ZIEBER

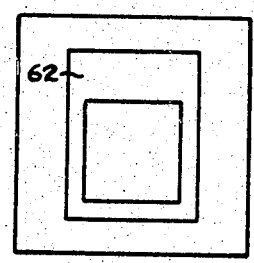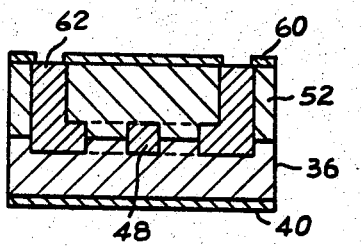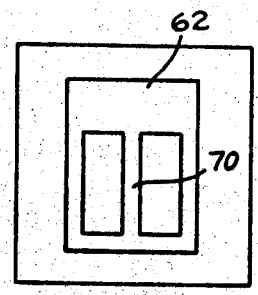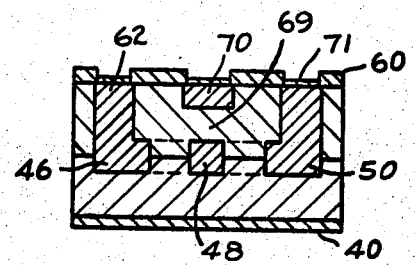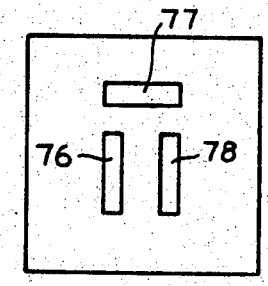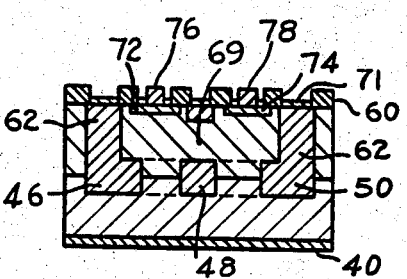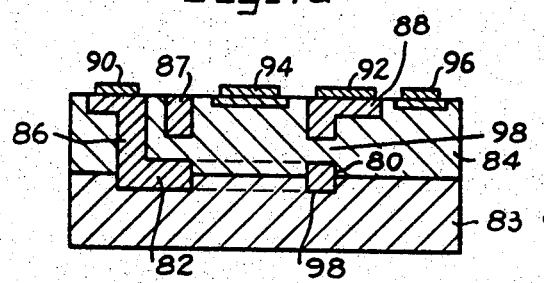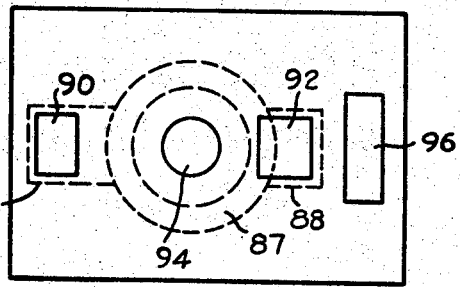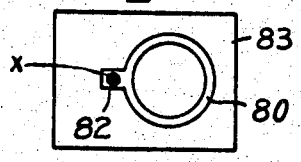
INVENTOR
JAMES B. COMPTON
FREDERICK L. ZIEBER
BY
ATTORNEY

3,453,504
UNIPOLAR TRANSISTOR
James B. Compton, Campbell, and Frederick L. Zieber, Mountain View, Calif., assignors to Siliconix Inc., Sunnyvale, Calif., a corporation of California
Filed Aug. 11, 1966, Ser. No. 571,914
Int. Cl. H01l *11/14, 15/00*
U.S. Cl. 317—235                             12 Claims

ABSTRACT OF THE DISCLOSURE

A field effect transistor characterized by a low gate-input capacitance and having an epitaxial layer formed on a substrate of relatively high resistivity material. Opposed gate regions are formed in the surface of the epitaxial layer and at the junctures between the epitaxial layer and the substrate to define a channel in the epitaxial layer. The gate regions are elgonated to provide a channel of desired width and minimum length. The portion of the substrate contiguous to the epitaxial layer is of higher resistivity than a channel or gate region to reduce the gate-input capacitance. A guard ring extends from the surface of the epitaxial layer into the substrate for limiting the active area of the device. The guard ring may intersect the elongated gate regions for providing low resistance electrical contact thereto.

---

The present invention relates to semiconductor signal translating devices and more particularly to such devices of the unipolar type.

Unipolar or field effect transistors are so named because the conduction mechanism involves the flow of majority carriers through a layer of semiconductor material between the source and drain connections, with the injection of minority carriers across a PN junction not normally being involved. Positioned between the source and drain connections is a channel region which is suitably surrounded by a gate region of opposite conductivity type, there being a PN junction between the channel region and the gate region. The device is biased such that the PN junction between the gate and channel is reverse biased producing depletion regions in which there is a shortage of the majority carriers. It is possible to sufficiently reverse bias the gate channel junction such that the depletion region extending into the channel will be sufficient to effectively pinch off the flow of current through the channel. The amount or degree of pinching off of the channel is a function of the potential impressed between the source and gate and the amplified replicas thereof are obtained in a load or utilization circuit connected between the source and the drain. Such devices exhibit characteristics very similar to that of a pentode vacuum tube, and accordingly possess great utility.

Unipolar or field effect transistors are most often characterized electrically by their gate-source cut-off current ($I_{GSS}$), the gate-drain breakdown voltage ($BV_{GDS}$), the drain current at 0 gate voltage ($I_{DSS}$), the gate-source pinch off voltage ($V_P$), the small signal common source forward transconductance ($g_{fs}$), the gate-source capacitance ($C_{gss}$), and the noise figure. In general, the resistivity of the material comprising the channel and the gate regions must be such as to provide the necessary gate-drain breakdown voltage characteristics. Thereafter, the physical dimensions of the channel and gate, as well as the resistivity of the channel and gate regions are chosen in an effort to obtain a maximum transconductance ($g_{fs}$). The remaining electrical characteristics may vary in accordance with the intended application for the device but in general it is desirable that the gate-source cut off current be small and that the drain current at 0 gate voltage also be small. The drain current ($I_{DSS}$) and the gate source cut off current ($I_{GSS}$) as well as the gate-source pinch off voltage ($V_P$) are primarily a function of the physical dimensions of the channel.

In accordance with the present invention, there is provided an improved structure for unipolar transistors and the method of making same that results in a unipolar or field effect transistor characterized by a very low gate-source capacitance ($C_{gss}$) and a desirably high transconductance ($g_{fs}$). The low capacitance permits operation at higher frequencies than would otherwise be attainable and the higher value for $g_{fs}$ means that a smaller change in gate voltage will produce a larger change in the drain source current under operating conditions.

In accordance with the principles of the present invention, there is provided a semiconductor signal translating device comprising a first layer of semiconductor material of one conductivity type and a second layer of semiconductor material of opposite conductivity type contiguous to the first layer and defining a PN junction therebetween. There is also provided a first region of one conductivity type extending along the plane of the PN junction between the first and second layers and a second region of the one conductivity type formed in the surface of the second layer in opposed relationship to the first region. The gate electrode or electrodes of the device are ohmically connected to the first and second regions, it being noted that either one or two gate electrodes may be provided. Source and drain contacts for the device are made to the second layer with the source and drain contacts being separated by the second region. The first and second regions are each of lower resistivity than the first layer.

In accordance with the method of the present invention, the device described above is preferably produced by diffusing impurities of one conductivity type into a substrate of semiconductor material which is also of the one conductivity type to form a region therein having a lower resistivity than the substrate. Thereafter, a layer of semiconductor material of opposite conductivity type is grown onto the substrate over the diffused region. This is preferably obtained using epitaxial techniques. A region of the one conductivity type is then formed in the surface of the grown layer, preferably by diffusion, in opposed, spaced apart relationship to the region formed in the surface of the substrate. Electrical contacts are thereafter provided to the first and second regions and to the grown layer on opposite sides of the second region. Preferably, there is also provided a guard region of the one conductivity type that extends through the grown layer into the substrate for the purpose of restricting the channel area and preventing the flow of current between the source and drain contacts except through the channel defined between the first and second regions.

Since the portion of the two gate regions which cooperate to produce pinch off of the channel between the source and drain connections can be of relatively low resistivity material, it is possible for the device of the present invention to be characterized by a high transconductance, $g_{fs}$. On the other hand, since the regions of low resistivity are of very limited size, with the remainder of the portion of the gate extending to the junction between the channel region and the gate region being of high resistivity material, the capacitance of the device can be reduced substantially without adversely affecting the trans-conductance of the device.

Many objects and advantages of the invention will become readily apparent to those skilled in the art as the following detailed description of a preferred embodiment of the same unfolds when taken in conjunction with the appended drawings wherein like reference numerals denote like parts and in which:

FIGURE 1a is a plan view of an improved unipolar transistor in accordance with a preferred embodiment of the present invention;

FIGURE 1b is a view in cross section taken along line b—b of FIGURE 1a;

FIGURE 2 is a plan view of a slice of semiconductive material in which a plurality of devices can be formed utilizing the principles of the present invention;

FIGURES 3a–7a are top plan views of a semiconductor die at separate stages of manufacture thereof in accordance with the present invention;

FIGURES 3b–7b are views in cross section similar to FIGURE 1b showing a semiconductor device at separate stages of manufacture thereof in accordance with the present invention;

FIGURES 8a and 8b are views similar to FIGURES 1a and 1b illustrating a device in accordance with a second embodiment of the present invention;

FIGURE 8c is a plan view showing a diffusion pattern suitable for use at an intermediate stage in the fabrication of the device in accordance with the second embodiment of the present invention.

Figure 9A:
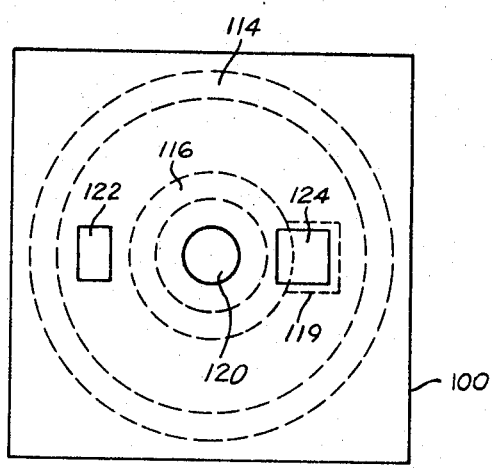
FIGURES 9a–9c are views similar to FIGURES 8a–8c illustrating a device in accordance with a third embodiment of the present invention.

Turning now to FIGURES 1a and 1b of the drawing, the device in accordance with one preferred embodiment of the invention is designated generally by the reference character 10. It can be seen to comprise a first layer 12 of semiconductive material of one conductivity type and a second layer 14 of opposite conductivity type contiguous thereto and defining a PN junction 16 therebetween. In accordance with a preferred embodiment of the invention described herein, the layer 12 is of P-type conductivity and layer 14 is of N-type conductivity, although the converse can be true. Positioned interiorly of the device 10, and preferably completely enclosed by the semiconductor body comprising the layers 12 and 14, is a region 18 which is suitably elongated and of small cross sectional area. The region 18 is also of the one conductivity type and extends at least to the plane of the PN junction 16 formed between layers 12 and 14 and is suitably intersected by the plane of the junction 16 as shown in FIGURE 1b. There is also provided a second region 20 of the one conductivity type, the second region being formed in the surface of the second layer 14 but in substantially parallel opposed relationship to the first region 18. The region 20 is also suitably elongated. Ohmic contacts 22 and 24 are provided to the layer 14 on opposite sides of the elongated region 20. Contact 22 suitably serves as the source connection to the device and contact 24 suitably serves as the drain connection.

In accordance with the preferred embodiment of the invention shown in FIGURES 1a and 1b, there is also provided a guard region 26 which extends from the surface of layer 14 to the PN junction 16 and which also crosses regions 18 and 20, the guard region also being of the one conductivity type. The flow of carriers between the source and drain connections 22 and 24, respectively is therefore limited to flow through channel region 28. Ohmic contact 25 is made to the guard region 26, thereby effectively providing ohmic contact to the gate regions 18 and 20. It will be appreciated, however, that if the regions 18 and 20 extend to the edges of the device, the guard region will not be necessary and the ohmic connection can be made to region 18 either at its exposed end at the edge of the device or through a diffused layer extending from the surface of layer 14. Provision of the guard region 26 is desirable from the standpoint that it limits the area of the active portion of the junction 16, further reducing the capacitance of the device, and also makes it possible for all active junctions to terminate at the upper surface of the device.

In accordance with the principles of the present invention, the layer 12 is of substantially higher resistivity material than region 18. For example, regions 18 and 20 may suitably have a resistivity of approximately 0.1 ohm centimeters whereas the layer 12 may have a resistivity of 75 to 200 ohm centimeters or even higher. As a result of this unique structure, the capacitance between the channel portion of the N-type layer 14 and the base of the channel defined by the layer 12 and the region 18 will be decreased substantially, resulting in an increase in the frequency at which the device is capable of operating. On the other hand, since the regions 18 and 20 which define the channel 28 can be of low resistivity material, the device provided by the present invention can be characterized by a high transconductance ($g_{ts}$).

Turning now to FIGURES 2–7 of the drawings, the preferred method of fabrication of the device of FIGURE 1 will now be described. In accordance with the method of the present invention, a plurality of devices are suitably formed in a single slice of semiconductive material of the type shown in FIGURE 2 of the drawings and denoted generally by the reference character 30.

The slice or wafer 30 is formed of semiconductive material, such as silicon, having, for example, a P-type impurity therein. However, the concentration of impurities therein is suitably quite low such that the bulk resistivity of the wafer 30 is quite high and preferably in the range of 75 to 200 ohm centimeters, although the resistivity of the material could be either lower or higher and yet obtain the advantageous benefits of the present invention. The wafer 30 is suitably in the order of 0.007 inch thick after being polished in a manner conventional in the art. Upon completion of various diffusion, epitaxial growth, plating and other process steps, the wafer 30 can be scribed along lines 32 and 34 to define a plurality of die 36, each having the necessary junctions and contact regions formed therein to define a unipolar transistor in accordance with the present invention.

Turning now to FIGURES 3–7 of the drawings, there is shown one of the die 36 which can be cut from wafer 30 at various stages in processing of the slice or wafer 30. Thus, there is shown in FIGURES 3a and 3b a die as could be cut from the wafer 30 comprising a substrate 31 having coatings 38 and 40 covering its upper and lower surfaces, respectively. Preferably, this coating is formed of silicon dioxide and various methods of producing such a coating are known in the art as, for example, exposure of the wafer 30 to moisture and air in the presence of heat or by utilization of an oxidizing agent such as hydrogen peroxide or the like. A portion of the oxide layer 38 has been removed from the upper surface of the wafer 30 to expose the surface of regions 42, 44, 46, 48 and 50. This is preferably accomplished by utilizing conventional photomasking techniques to protect regions of the oxide layer which are not to be removed and thereafter exposing wafer 30 to a suitable etchant, such as a mixture of ammonium bifluoride and water, for removal of the silicon dioxide from the exposed portions of the upper surface of the wafer 30.

Slice 30 was then exposed to impurity of the one, or in this specific example, a P-type conductivity, to produce diffusion of the impurity into the exposed regions of wafer 30. In accordance with one specific example of the invention, nitrogen was bubbled through boron tribromide and passed over the wafer to deposit a thin layer of borosilicate glass over the surface of the wafer. The wafer was then heated to 1200° C. in an oxidizing atmosphere to produce diffusion of the boron into the exposed regions of the upper surface of the wafer 30. The resulting regions in the surface of the wafer 30 are suitably characterized by a surface concentration in the order of $10^{19}$ atoms per cubic centimeter. The remaining portion of the coating 38 and the borosilicate glass was then removed from the upper surface of the wafer 30 by exposing wafer 30 to a mixture of ammonium bifluoride and water or other suitable etchant, such as a mixture of water and hydrofluoric acid.

Nitrogen was then bubbled through silicon tetrachloride having a small portion of arsenic trichloride therein and passed over the wafer 30 with the wafer maintained at a temperature from 1180° to 1200° C., epitaxially growing a layer 52 onto the upper surface of the wafer 30. The layer 52 of epitaxially grown material was of N-type conductivity approximately 10 to 12 microns thick and had a resistivity of 1.5 ohm centimeters. It is to be noted that the resistivity of the layer 52 determines, to a substantial extent, the breakdown voltage characteristics of the device. The device made as above described exhibited breakdown between the gate and source junction of 60 to 70 volts.

It can be seen that the plane of the PN junction 54 between the substrate 36 and the epitaxially grown layer 52 passes through the diffused regions 42, 44, 46, 48 and 50 due to an out diffusion of boron from these regions into the epitaxial layer 52 as it is being grown. It will be noted, however, that there are techniques available in which the epitaxial layer 52 can be grown without out diffusion of impurities from the diffused regions formed in the surface of the wafer 30, in which event the diffused regions would only extend to the place of the PN punction. In accordance with the preferred embodiment of the invention, at this stage of manufacture the diffused regions 42, 44, 46, 48 and 50 are positioned interiorly of the die 36 and would not extend to the surface at any point.

Turning now to FIGURES 5a and 5b of the drawings, a silicon dioxide layer 60 is formed on the upper surface of the epitaxially grown layer 52 and portions of the oxide moved from region 62 that overlies the periphery of the pattern formed as a result of diffusion into the regions 42, 44, 46, 48 and 50. Borosilicate glass was then deposited by again bubbling nitrogen through boron tribromide. The wafer was then heated to 1200° C. in an oxidizing atmosphere to produce diffusion into the die 36 forming the guard region 62 which extends to and intersects the diffused regions 42, 44, 46 and 50. The oxide overlying region 70 was then removed and boron deposited and diffused as described above to provide the region 70 of P+ conductivity overlying the elongated region 48 and resulting in the structure shown in FIGURES 6a and 6b. A channel 69 is formed between region 48 and region 70.

It will be noted that the out diffusion from the original substrate into the epitaxially grown layer renders it desirable, although not necessary, that the grid type structure shown in FIGURE 3a be formed during the initial diffusion rather than only the elongated region 48 being formed. This is true because that, although the diffusion from the surface when the guard region 62 is formed proceeds at a much faster rate than the out diffusion from the region 48, by the time the diffusion of impurities from the surface of the epitaxial layer 52 has extended to the PN junction 54, out diffusion of the region 48 would have extended substantially into epitaxially grown layer 52, resulting in both a depletion of the concentration within the region 48 and an unnecessarily great narrowing of the region above region 48 and below the surface of layer 52. It would therefore, in many instances, be necessary to grow the epitaxial layer much thicker than that described in order to have the necessary separation between regions 48 and 70. It will be noted that a thin oxide layer 71 is formed over regions 62 and 70 during the above diffusion steps.

Portions of the oxide layer were then removed as necessary to expose the regions 72 and 74. Oxygen was then bubbled through phosphorous oxychloride and passed over the slice 30 with the slice maintained at a temperature of 1200° C. to produce regions 72 and 74 of N+ conductivity. Portions of the oxide layer were then removed as necessary to expose the desired contact areas and aluminum evaporated over the upper surface of the epitaxially grown layer 52. Undesired aluminum is then removed, again utilizing conventional photomasking and etching techniques to provide the contact structure comprising contacts 76, 77 and 78, similar to that shown in FIGURES 1a and 1b.

It will be appreciated that the device shown and described with reference to FIGURES 1–7 of the drawings is a triode type device wherein the two gates of the unipolar transistor are connected to a common gate lead. In many applications, a tetrode type structure is desirable in which the bias voltage applied to one gate would be different from that applied to the other with each gate having its individual electrode. Such a structure is shown in FIGURES 8a, 8b and 8c of the drawings. Thus, as shown in FIGURE 8c, a diffusion corresponding to that illustrated in FIGURES 3a and 3b can be utilized to provide a region 80 of annular configuration having an enlarged portion 82 extending from one side thereof in substrate 83. The N-type epitaxial layer 84 can be grown as described with reference to FIGURES 4a and 4b and P-type region 86 diffused from the surface of the epitaxial layer into the enlarged portion 82 for the purpose of making ohmic contact to the diffused annular region 80. This step would be comparable to the guard region diffusion described with reference to FIGURES 5a and 5b. Thereafter, in a manner similar to that described with reference to FIGURES 6a and 6b, an annular gate region 87 can be formed in the surface of the epitaxial layer 84 by diffusion, the annular region 87 overlying the annular region 80. The annular region 87 suitably includes an enlarged portion 88 for purpose of accommodating ohmic connection to the semiconductor die. Thereafter, ohmic contact 90 can be applied to the region 86, ohmic contact 92 can be applied to the diffused region 88, and ohmic contact 94 can be applied to the surface of the epitaxially grown layer 84, with the contact 94 being preferably disposed centrally of the annular diffused region 87. A fourth ohmic contact 96 can be applied to the surface of the epitaxially grown layer 84, with the contact 96 being separated from contact 94 by region 87, all as shown in FIGURES 8c and 8a. Contact 90 would therefore function as a gate 2 connection, contact 92 would function as a gate 1 connection, contact 94 would function as a drain connection, and contact 96 would function as a source connection. With such a structure, the flow of carriers between the source and drain would be through channel 98 defined between the annular gate region 87 and the annular gate region 80, the channel 98 also being of annular configuration. It will be noted that a guard region is not shown in the device of FIGURES 8a–8c, although one would be desirable in many instances and could be provided as an alternative to the region 86 which is of reduced size. It is also noteworthy that contact to the buried gate region 80 could be obtained by ohmic contact to the substrate 83, if desired, since regions 80 and 83 are of common resistivity type, although of different resistivity.

Figure 9B:
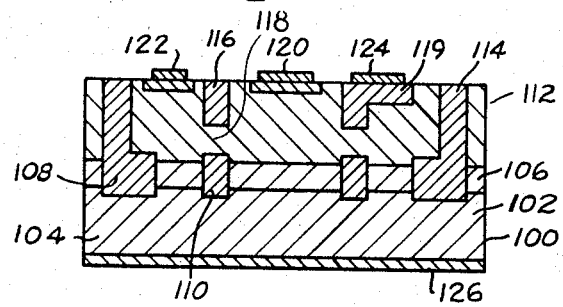
Figure 9C:
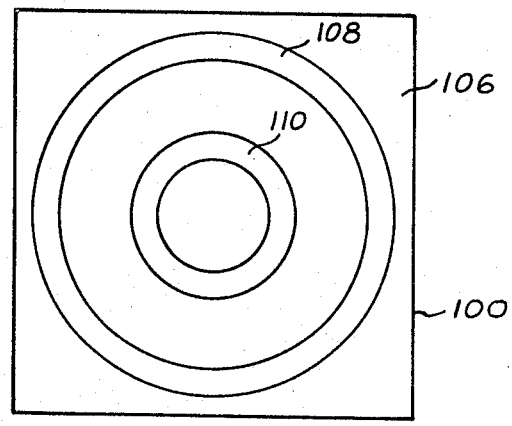

Turning now to FIGURES 9a–9c of the drawings, there is illustrated still a third embodiment of the invention designated generally by the reference character 100. In accordance with the third embodiment of the invention, the substrate 102 is of the one conductivity type and includes a region 104 of very low resistivity material having a thin layer 106 of very high resistivity material defined in its upper surface. Region 106 is suitably an epitaxially grown layer, although it can be provided by appropriate diffusion and lapping techniques. Annular regions 108 and 110 were then formed by diffusion of the one conductivity type impurities into the surface of the high resistivity region 106, as shown in FIGURE 9c. Thereafter, an epitaxially grown layer 112 of the opposite conductivity type was formed in a manner similar to that described previously with reference to FIGURES 4a and 4b of the drawings. The guard ring 114 was then formed by diffusion of impurities of the one conductivity type into the epitaxial layer 112 with the guard ring 114 extending into contact with the annular diffused region 108. It will be noted that regions 108 and 110 suitably extend through region 106 of high resistivity material into the layer 102 of low resistivity material. Annular region 116 was then formed in the surface of the layer 112 by diffusion of impurities of the one conductivity type. It will be noted that the annular region 116 overlies the annular region 110 defining a channel 118 therebetween. As described previously with respect to FIGURES 8a–8c, annular region 116 suitably includes an enlarged portion 119 for the purpose of accommodating ohmic connection to the region 116. Thereafter, ohmic contact 120 which functions as the drain connection was formed on the surface of the layer 112, the contact 120 preferably being disposed centrally of the annular diffused region 116. Ohmic contact 122 was also formed to the surface of layer 112, with the contact 122 being positioned between annular region 116 and guard region 114. Ohmic contact 122 functions as a source contact. Ohmic contact 124 was applied to the enlarged portion 119, extending from the annular region 116, to provide contact thereto which functions as gate 1 connection. A fourth ohmic contact 126 is provided to the lower surface of the substrate 102. It will be noted that since the region 110 extends into the low resistivity region 104 that a low resistivity path is provided between contact 126 and the region 110, permitting contact 126 to function as gate 2 connection. If it is desired that all contacts be on the upper surface, contact 126 can be applied to the guard region 114, since regions 104, 106, 108, 110 and 114 are all of common type conductivity.

It will be appreciated by those skilled in the art that the structure disclosed with regard to FIGURES 9a–9c of the drawings was readily adaptable for a triode type structure in that by extending the region 119 until it crosses the guard region 114 the contact 124 will also be connected to the region 116 by a low resistivity path. Similar results could, of course, be accomplished by a configuration in which the regions 116 and 110 are elongated, each extending across the region bounded by the guard ring. If such a structure is utilized, it will only be necessary that either the region 110 or the region 108 extend through the layer 106 for optimum results. In fact, since the gate current which normally flows is quite low, it is not essential that the regions 108 and 110 extend into the low resistivity region 104, although it generally is desirable.

It will be appreciated by those skilled in the art that the figures of the drawings are intended to illustrate the concepts of the present invention and are not to scale. Thus, the epitaxial layers of the opposite conductivity type are each suitably extremely thin as compared to the thickness of the die. Similarly, the width of the regions of the one conductivity type of low resistivity material that define the various channels is also desirably extremely small, suitably in the order of 0.0001 inch or less.

Although the invention has been described with reference to particular preferred embodiments thereof, many changes and modifications will become apparent to those skilled in the art in view of the foregoing description which is intended to be illustrative and not limiting of the invention defined in the appended claims.

We claim:
1. A semiconductor field effect device comprising:
 (a) a first layer of semiconductor material of one conductivity type;
 (b) a second layer of semiconductor material of opposite conductivity type contiguous to said first layer and defining a PN junction therebetween, said second layer being of epitaxially grown material and having a lower resistivity than the portion of said first layer contiguous to said second layer;
 (c) a first diffused gate region of said one conductivity type extending along a portion of the plane of said PN junction;
 (d) a second diffused gate region of said one conductivity type formed in the surface of said second layer in opposed relationship to said first region and defining a channel therebetween;
 (e) first and second low resistance contacts to said second layer on opposite sides of said channel;
 (f) means for making low resistance electrical contact to said first and second regions including a low resistivity guard region of the one conductivity type bounding a portion of said second layer contacted by said first and second low resistance contacts and extending from the surface of said second layer to said PN junction and contracting said first region, and
 (g) said first and second regions being of lower resistivity than the portion of said first layer contiguous to said second layer and elongated in a direction normal to the channel whereby their length is much greater than their width;
 (h) the gate-input capacitance of the device being reduced by the portion of the first layer contiguous to the second layer and bounded by the guard region being of higher resistivity than said second layer and said first and second regions.

2. A semiconductor field effect device as defined in claim 1 wherein said first region extends into said guard region and wherein said guard region is of lower resistivity than said portion of said first layer contiguous to said second layer for providing low resistance contact to said first region.

3. A semiconductor field effect device as defined in claim 1 wherein said first and second regions each define a closed loop and said first contact is connected to said second layer at a region bounded by said second region.

4. A semiconductor signal translating field effect device as defined in claim 1 wherein the portion of the first layer contiguous to said second layer is of higher resistivity than the remaining portion of the first layer contiguous to said second layer.

5. A semiconductor field effect device as defined in claim 4 wherein said means for making electrical contact to said first region comprises a contact to said remaining portion of first layer.

6. A semiconductor field effect device as defined in claim 1 wherein said second layer is of higher resistivity than said first and second regions.

7. A semiconductor field effect device as defined in claim 1 further including a third region of one conductivity type extending along the plane of said PN junction in opposed relationship to said guard region and of the same configuration as said guard region and wherein said guard region extends into said third region.

8. A semiconductor field effect device as defined in claim 1 wherein said first region is formed partially in said first layer and partially in said second layer.

9. A semiconductor field effect device as defined in claim 1 wherein said first region is disposed internally of said device and does not extend to any surface.

10. A semiconductor field effect device comprising:
 (a) a first layer of semiconductor material of one conductivity type;
 (b) a second layer of semiconductor material of opposite conductivity type contiguous to said first layer and defining a PN junction therebetween, said second layer being of epitaxially grown material;
 (c) a first diffused gate region of said one conductivity type extending along a portion of the plane of said PN junction;
 (d) a second diffused gate region of said one conductivity type formed in the surface of said second layer in opposed relationship to said first region and defining a channel therebetween;
 (e) first and second low resistance contacts to said second layer on opposite sides of said channel;
 (f) a guard region of the one conductivity type bounding a portion of said second layer contacted by said first and second contacts and extending from the surface of said second layer to the PN junction between the first and second layer;

(g) said first and second regions being elongated in a direction normal to the channel whereby their length is greater than their width and intersecting said guard region at opposite sides of said channel whereby said guard ring establishes the width of said channel and provides low resistance electrical contact to said first and second gate regions;

(h) the portion of said first layer contiguous to said second layer having a higher resistance than said second layer and said first and second gate regions to reduce the gate-input capacitance of the device.

11. A semiconductor field effect device comprising:
(a) a first layer of semiconductor material of one conductivity type;
(b) a second layer of semiconductor material of opposite conductivity type contiguous to the first layer, the portion of the first layer contiguous to the second layer being of higher resistivity than the remainder of the first layer;
(c) a first region of said one conductivity type extending along a portion of the plane of the PN junction and extending into the remainder of the first layer;
(d) a second region of said one conductivity formed in the surface of the second layer in opposed relationship to said first origin and defining a channel therebetween;
(e) said first and second regions being elongated in a direction normal to the channel whereby their length is much greater than their width;
(f) first and second low resistance contacts to said second layer on opposite sides of said channel; and
(g) means for making low resistance contact to said second region, and means for making low resistance contact to the first resistance contact to the remainder of the first layer;
(h) the portion of said first layer contiguous to said second layer being of higher resistivity than said second layer or the first or second regions for reducing the gate-input capacitance of the device.

12. A field effect device as defined in claim 11 wherein said first and second regions each define a closed loop.

References Cited

UNITED STATES PATENTS

| | | | |
|---|---|---|---|
| 2,967,985 | 1/1961 | Shockley et al. | 317—235 |
| 3,358,195 | 12/1967 | Onodera | 317—235.21 |
| 3,363,152 | 1/1968 | Lin | 317—235.21 |
| 3,223,904 | 12/1965 | Warner et al. | 317—235.21 |
| 3,244,950 | 3/1966 | Ferguson | 317—235.22 |
| 3,275,908 | 9/1966 | Grosvalet | 317—235.21 |
| 3,293,087 | 12/1966 | Porter | 317—235.21 |

FOREIGN PATENTS 1,406,942  6/1965  France.

OTHER REFERENCES

Electronics "The Field-Effect Transistor: a 'curiosity' comes of age" by Eimbinder, Nov. 30, 1964, pp. 46–49.

JOHN W. HUCKERT, *Primary Examiner.*

J. D. CRAIG, *Assistant Examiner.*

U.S. Cl. X.R.

148—175

UNITED STATES PATENT OFFICE
CERTIFICATE OF CORRECTION

Patent No. 3,453,504  
July 1, 1969

James B. Compton et al.

It is certified that error appears in the above identified patent and that said Letters Patent are hereby corrected as shown below:

Column 8, line 13, "contracting" should read -- contacting --. Column 10, line 3, after "first" insert -- region including a low --.

Signed and sealed this 15th day of December 1970.

(SEAL)  
Attest:

Edward M. Fletcher, Jr.  
Attesting Officer

WILLIAM E. SCHUYLER, JR.  
Commissioner of Patents

Disclaimer 3,453,504.—*James B. Compton*, Campbell, and *Frederick L. Zieber*, Mountain View, Calif. UNIPOLAR TRANSISTOR. Patent dated July 1, 1969. Disclaimer filed May 4, 1971, by the assignee, *Siliconix, Inc.*

Hereby enters this disclaimer to claims 1, 2, 6, 7, 8, 9 and 10 of said patent.

[*Official Gazette May 20, 1975.*]